(12) United States Patent
Fong

(10) Patent No.: US 7,844,522 B2
(45) Date of Patent: Nov. 30, 2010

(54) METHOD AND APPARATUS FOR MONITORING AND VERIFYING A TRANSFER OF FINANCIAL SETTINGS

(75) Inventor: Spencer W. Fong, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 21 days.

(21) Appl. No.: 11/928,567

(22) Filed: Oct. 30, 2007

(65) Prior Publication Data

US 2009/0112746 A1 Apr. 30, 2009

(51) Int. Cl.
*G06Q 40/00* (2006.01)
(52) U.S. Cl. .......................................... 705/35
(58) Field of Classification Search ........................ None
See application file for complete search history.

(56) References Cited

U.S. PATENT DOCUMENTS

| | | | | |
|---|---|---|---|---|
| 4,694,397 A | * | 9/1987 | Grant et al. | 705/42 |
| 4,948,174 A | * | 8/1990 | Thomson et al. | 283/58 |
| 5,220,501 A | * | 6/1993 | Lawlor et al. | 705/40 |
| 5,852,811 A | * | 12/1998 | Atkins | 705/36 R |
| 6,185,544 B1 | * | 2/2001 | Sakamoto et al. | 705/40 |
| 6,233,565 B1 | * | 5/2001 | Lewis et al. | 705/35 |
| 2002/0013767 A1 | * | 1/2002 | Katz | 705/39 |
| 2002/0029194 A1 | * | 3/2002 | Lewis et al. | 705/39 |
| 2005/0027648 A1 | * | 2/2005 | Knowles et al. | 705/38 |
| 2005/0182774 A1 | * | 8/2005 | Weir et al. | 707/100 |
| 2006/0116949 A1 | * | 6/2006 | Wehunt et al. | 705/35 |

* cited by examiner

*Primary Examiner*—Thomas Dixon
*Assistant Examiner*—Gerald C Vizvary
(74) *Attorney, Agent, or Firm*—Park, Vaughan, Fleming & Dowler LLP; Mark Spiller

(57) ABSTRACT

One embodiment of the present invention provides a system that monitors and verifies a transfer of financial settings. During operation, the system receives a request to transfer a set of financial settings from an initial account to a destination account. In response to the transfer request, the system transfers the financial settings and then monitors the initial account following the transfer to determine whether any subsequent transactions occur. If so, the system analyzes each subsequent transaction to determine whether the subsequent transaction is associated with the transferred financial settings. By monitoring and analyzing subsequent transactions, the system verifies the success of the transfer.

18 Claims, 3 Drawing Sheets

METHOD AND APPARATUS FOR MONITORING AND VERIFYING A TRANSFER OF FINANCIAL SETTINGS

BACKGROUND

Users often desire to switch a financial account from one financial institution to another. For instance, a user who discovers a prospective financial institution with better services or rates may want to switch away from their existing financial institution. However, switching accounts from one financial institution to another can involve considerable overhead. For example, a user seeking to switch an account to another financial institution must re-enter or transfer financial settings previously established for automated services associated with their existing accounts (such as direct deposit, "e-bills," and electronic bill pay). Copying such information for accounts at a new financial institution can be a time-consuming and error-prone process.

Some automated systems can facilitate account switching by automatically collecting such financial settings for a given account and transferring them to a destination account at a new financial institution. While such systems assist in the account-switching process, there remains a danger that some settings may not transfer correctly, or that existing scheduled transactions will remain linked to an original account at the previous financial institution. Hence, some important transactions may not occur or may fail, and as a consequence a user may face severe financial consequences.

Hence, what is needed is a system that facilitates transferring financial settings without the above-described problems.

SUMMARY

One embodiment of the present invention provides a system that monitors and verifies a transfer of financial settings. During operation, the system receives a request to transfer a set of financial settings from an initial account to a destination account. In response to the transfer request, the system transfers the financial settings and then monitors the initial account following the transfer to determine whether any subsequent transactions occur. If so, the system analyzes each subsequent transaction to determine whether the subsequent transaction is associated with the transferred financial settings. By monitoring and analyzing subsequent transactions, the system verifies that the transfer has succeeded. Note that verifying the success of the transfer can involve a number of operations including, but not limited to: 1) verifying that a specified set of financial settings have been successfully transferred from the initial account to the destination account; 2) confirming that transactions associated with the financial settings no longer occur in the initial account; 3) detecting additional transactions in the initial account that indicate errors or omissions in the transfer process, such as transactions associated with financial settings that did not transfer to the destination account due to errors and/or accidental omission (sometimes resulting in duplicate or uncompleted transactions in the initial and destination accounts).

In some embodiments, the system gathers and presents to a user as part of a selection process an initial set of financial settings identified for the initial account. The user can then specify all or a subset of this initial set to be transferred to the destination account. Alternatively, the system may not involve a selection process, and instead transfer all known financial settings for the initial account. Note that the system may dynamically adjust monitoring behavior based on whether all or a subset of the financial settings for the initial account are transferred. For instance, if some financial settings are explicitly chosen by a user not to be transferred, the system may during monitoring ignore transactions in the initial account related to these financial settings. Alternatively, the system may continue to monitor all subsequent transactions in the initial account, or allow the user to specify individualized monitoring preferences for such situations.

In some embodiments, the financial settings are associated with one or more of: an automated funds transfer; a bill pay transaction; and/or an Automated Clearing House transaction (e.g., a transaction that involves an automated facility that settles payments and deposit transactions between member financial institutions).

In some embodiments, the financial settings can include one or more of: a vendor name; a monetary amount for a one-time and/or recurring financial transaction with the vendor; account and/or routing information associated with the vendor; a schedule for financial transactions with the vendor; and/or historical data for financial transactions with the vendor.

In some embodiments, the system accesses the initial account to retrieve records for transactions that occurred in the initial account after the transfer. Note that the system may access the initial account multiple times to retrieve such transaction information.

In some embodiments, the system performs a notification operation when it determines that a subsequent transaction is associated with the transferred financial settings. The system may alternatively (or additionally) attempt to stop additional future transactions by: repeating the transfer of the financial settings from the initial account to the destination account; adjusting parameters associated with the financial settings in the initial and/or destination account; and/or deleting the financial settings from the initial account.

In some embodiments, the system compares a subsequent transaction to a set of transactions specified by a user and/or administrator. For instance, the system may compare the transaction to a set of known transaction types to determine a type for the transaction. Note that such comparisons may involve considering an amount, a description, or a pattern for one or more subsequent transactions. For example, if the system may detect and flag as a possible pattern a set of subsequent transactions with a substantially similar amount that occur very regularly (e.g., a $45 payment that occurs on the $15^{th}$ of every month).

In some embodiments, the system may disable a recurring and/or scheduled transaction associated with the financial settings from the initial account after transferring the financial settings. The system may also determine whether to maintain a copy of the financial settings in the initial account or delete the financial settings from the initial account. For instance, if a user prefers not to monitor subsequent transactions in the initial account the system may delete the financial settings from the initial account, while otherwise preserving them for monitoring purposes.

DETAILED DESCRIPTION

Figure 1:
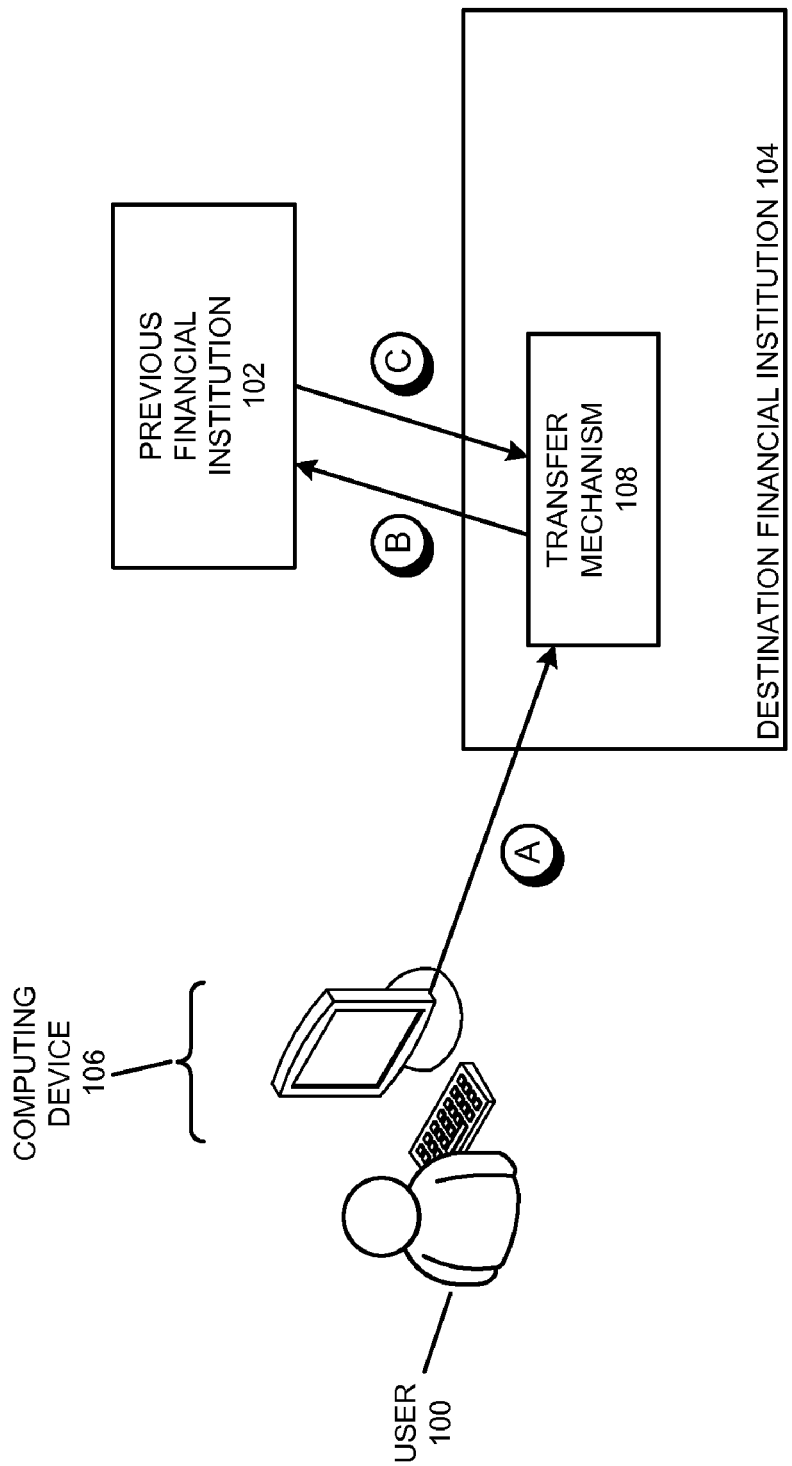
FIG. 1 illustrates an account-switching operation in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

OVERVIEW

Financial institutions typically seek to increase their customer base, and one common way to gain new customers is to lure them away from their competitors. However, one obstacle that discourages customers from switching to another financial institution is the overhead involved in transferring existing financial settings that have already been established with an existing financial institution to a prospective financial institution. For instance, a given customer may have already arranged to have their employer automatically deposit their paycheck into an account with their existing financial institution, or may have a number of automated monthly transactions established to send electronic bill payments (e.g., for utility bills) or to transfer funds to (or from) an investment account. Manually moving such financial settings to a new financial institution can involve significant effort and can potentially introduce errors.

A number of automated "account-switching" systems transfer such financial settings (e.g., payee and payment information for bill payments and funds transfers) from one financial institution to another. While such transfers sometimes work as intended, situations often arise where some payees or transactions may not be moved. For instance, Automated Clearing House (ACH) transactions that are triggered from a financial institution which is not involved in the transfer may require users to perform additional steps. Alternatively, if an account-switching system enables users to interactively select financial settings to be transferred, a user may accidentally forget to move a payee or payment. Such situations can result in missed transactions that are not moved, making the account-switching system unable to completely move the end user's account to the new financial institution and potentially causing financial problems due to missed, incorrect, or duplicate transactions.

FIG. 1 illustrates an account-switching operation in which user 100 transfers a set of financial settings for an existing account from an initial financial institution (also referred to as the "previous financial institution") to a new financial institution (also referred to as the "destination financial institution"). For instance, user 100 may browse to the web page of destination financial institution 104 using computing device 106 and initiate an account switch (operation A). A transfer mechanism 108 at destination financial institution 104 initiates the account switch, for instance, by using user-provided data to access the user's account at previous financial institution 102 (operation B). Note that transfer mechanism 108 can be provided by (as illustrated) or separate from destination financial institution 104. For instance, in one embodiment of the present invention transfer mechanism 108 may be a service provided by a third institution (e.g., a service bureau providing account-switching services for financial institutions).

During the transfer process, transfer mechanism 108 can use web-data-gathering and aggregation techniques to gather financial settings and historical data from the account at previous financial institution 102 and transfer this relationship information to destination financial institution 104 (operation C). Transfer mechanism 108 can then disable (or, if desired, delete) financial settings at previous financial institution 102 to limit future transactions for that account. Note that the account-switching process may involve additional steps. For instance, the system may allow a user to interactively view and select a subset of financial settings to transfer, which can lead to additional interactions between user 100, destination financial institution 104, and previous financial institution 102. The overall success of the account-switching operation often depends on the successful recognition and transfer of the financial data and the correctness of user actions, which can sometimes lead to unwanted errors and/or omissions.

Note that an account-switching operation might not always transfer a complete account, but may only transfer a subset of the funds and/or financial settings associated with an initial account. For instance, a user might choose not to transfer financial settings for a vendor that is no longer actively used. The system can still detect errors associated with subsequent transactions in the initial account arising from such un-transferred financial settings (e.g., if the user is still in the process of terminating a service with a vendor at the time of the transfer, the system may detect subsequent transactions in the initial account that are triggered by the vendor after the account-switching operation). The system can also detect potential errors associated with the erroneous addition of financial settings and/or automated transactions to the initial account after the account-switching operation (e.g., when a user accidentally forgets about a transfer and sets up additional financial settings that trigger additional transactions, or in a joint account, when an account holder not informed of a transfer triggers additional transactions in the initial account after the transfer).

One embodiment of the present invention provides a system that monitors and verifies the success of an account-switching operation. After the initial transfer of financial data, the system continues to monitor the original account at the previous financial institution to detect whether any transactions associated with the transferred financial settings still occur. Hence, the system can verify whether the account-switching operation succeeded over a time interval, thereby confirming the successful transfer of the financial settings and improving users' account-switching experiences.

Monitoring and Verifying Account-Switching Operations

Figure 2:
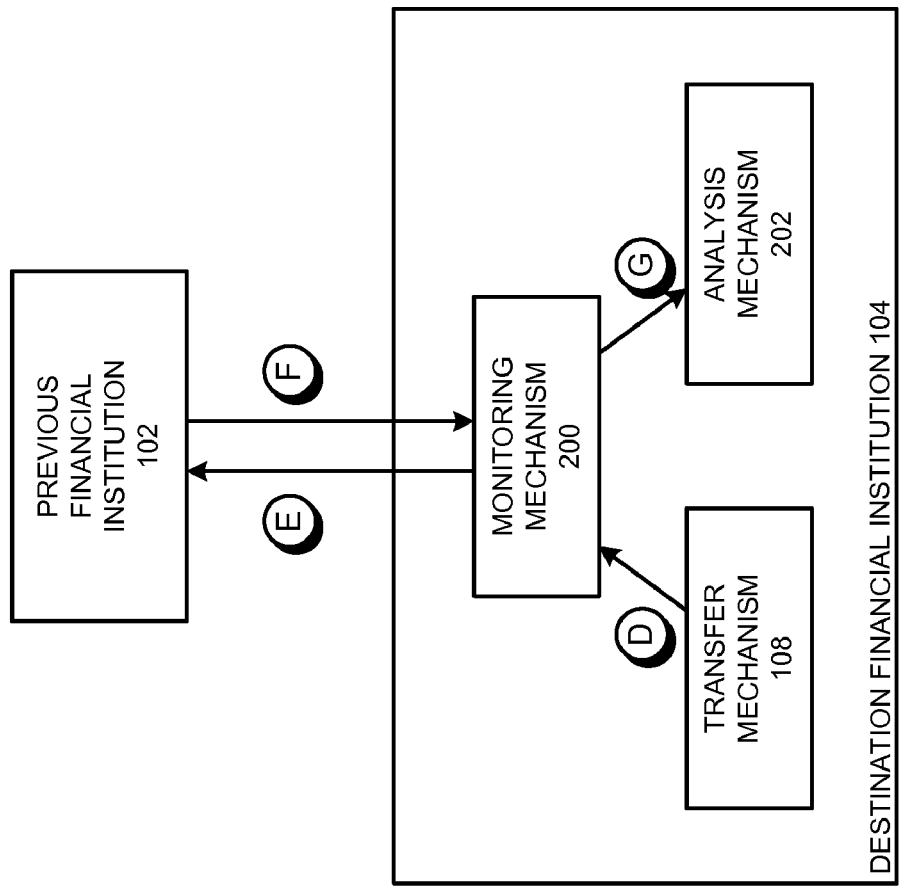
FIG. 2 illustrates the process of monitoring an account at a financial institution in accordance with an embodiment of the present invention.
Figure 2:
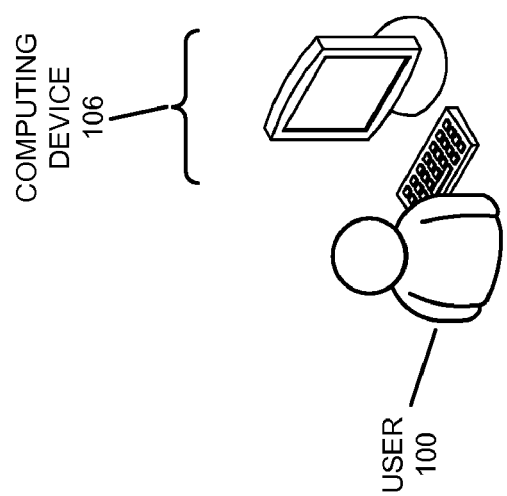

FIG. 2 illustrates the process of monitoring an account at a previous financial institution 102 after an account-switching operation (shown in FIG. 1). Referring to FIG. 2, transfer mechanism 108 provides monitoring mechanism 200 with data that enables monitoring mechanism 200 to access a user's account at previous financial institution 102 (operation D). Monitoring mechanism 200 then employs data collection and aggregation techniques to check the account at previous financial institution 102 to determine whether additional transactions have taken place after the transfer of the financial settings (and their associated financial relationships) to destination financial institution 104 (operation E). Monitoring mechanism 200 retrieves the information for such transactions (operation F) and passes this information to analysis mechanism 202, which determines whether these transactions relate to the transferred financial settings (operation G). If so, analysis mechanism 202 may send a notification message or perform some type of action to indicate that the transfer process may not have completed successfully. Note that (as for transfer mechanism 108 in FIG. 1) transfer mechanism 108, monitoring mechanism 200, and analysis mechanism 202 in FIG. 2 may be provided by destination financial institution 104 (as illustrated in FIG. 2), or may instead be services provided by another institution other than destination financial institution 104.

In one embodiment of the present invention, the system monitors a user's previous account for: bill pay transactions; Automated Clearing House (ACH) transactions (e.g., transactions that involve an automated facility that settles payments and deposit transactions between member financial institutions); and/or other automated (and, if desired, non-automated) funds transfers into and/or out of the previous account. Note that by monitoring such transactions the system can detect transactions that are authorized to access the previous account but which may not show up during the account-switching operation from the previous financial institution because they are initiated by an external financial institution. For instance, a brokerage account may be set up to automatically withdraw funds from a bank account using ACH based on a user request or schedule. If this relationship is established from the brokerage-account side, the bank account may be configured to simply allow access by the brokerage account, but may not include any additional financial settings or information relating to such transfers beyond a record that a given transaction was authorized and occurred. In such a situation, a user will still need to make an additional adjustment to the brokerage account after the account-switching operation, but monitoring mechanism 200 can alert the user about otherwise-forgotten transactions of this type from external parties, so that the user can make such adjustments.

In one embodiment of the present invention, the financial settings transferred during the account-switching operation can include: a vendor name; a monetary amount for a one-time and/or recurring financial transaction with the vendor; account and/or routing information associated with the vendor, including a vendor address and other contact information; a schedule for financial transactions with the vendor; and/or historical data for financial transactions involving the vendor.

In one embodiment of the present invention, the system accesses the previous account one or more times to search for additional transactions and to retrieve information associated with such transactions. Such checks may be configured to occur periodically over a specified time interval, e.g., on a nightly basis over a 60-day timeframe, or at a user-specified interval. For instance, the system may query the user at the start of the account-switching operation to determine both whether the user would like to use the monitoring and verification feature, and, if so, the desired time interval and frequency of checks. At this time the system may also request the user credentials needed to access the account at the previous financial institution, and store these credentials in a secure manner to enable access later when monitoring the previous account.

Note that the system can use web and/or data aggregation techniques during transaction monitoring to gather data from the previous financial institution. For instance, if the previous financial institution facilitates viewing information in the previous account using a web browser, the system may use techniques that automatically log into such web pages to data-mine financial settings and transaction data for both the transfer and monitoring processes. Alternatively, the system may also use other data acquisition techniques for accessing the previous account, based on the data interface provided by the previous financial institution. Note that some transactions may not be completely recognizable to a monitoring system, depending on the financial institution and the type of transaction. For instance, some types of ACH transactions may be more easily recognized than others (e.g., based on a tag or format), and some banks may artificially limit the level of detail available for a given transaction type. Hence, the system may include a set of special rules and/or techniques to identify transactions. For example, the system may compare a given transaction to a set of transactions already identified or flagged by a user and/or administrator to determine the nature of the given transaction. The system may also include a list of transactions that have been explicitly cleared by a user already, and should not be flagged during monitoring and analysis.

In one embodiment of the present invention, the system can perform a range of actions when it determines that a subsequent transaction is associated with the transferred financial settings. For example, the system can be configured to notify a user of an automated payment that is being duplicated in both the previous and new accounts using a variety of methods (e.g., email, a mobile phone notification, or a "really simple syndication" (RSS) update). Alternatively, the system may attempt to automatically fix detected errors, for instance, by: repeating the transfer of financial settings from the previous account to the destination account; adjusting parameters associated with a set of financial settings in the previous and/or destination account; and/or deleting the set of financial settings from the previous account. Note that the system may already allow a user to specify such secondary actions at the time the account-switching operation is initiated, or the system may handle such actions automatically. Note also that in some instances, if the system cannot identify and/or categorize a given transaction, the only option may be to notify a person (e.g., either a user or an administrator) that additional action is needed to complete the account switch.

Figure 3:
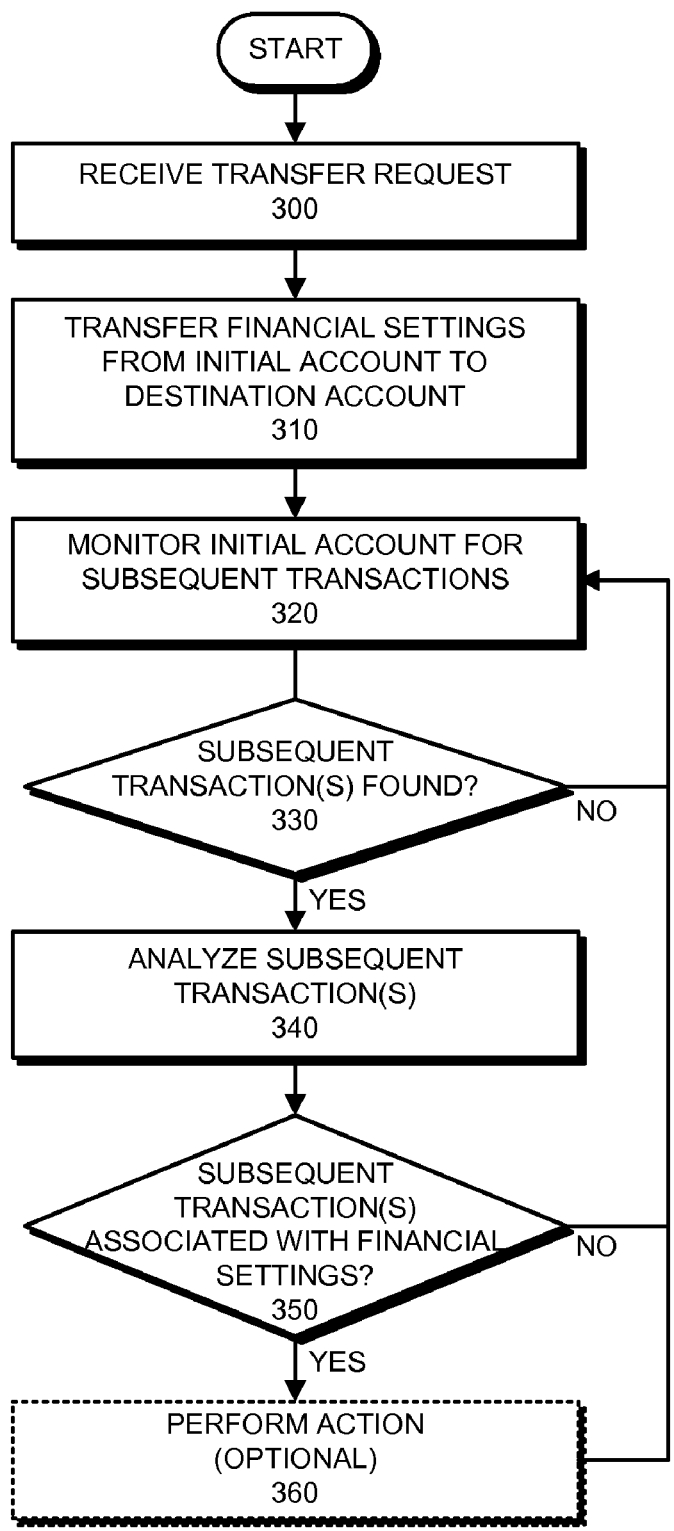
FIG. 3 presents a flow chart illustrating the process of monitoring and verifying the transfer of financial settings in accordance with an embodiment of the present invention.

FIG. 3 illustrates the process of monitoring and verifying the transfer of financial settings. During operation, the system receives a request to transfer a set of financial settings from an initial account to a destination account (operation 300). The system transfers the financial settings in response to the transfer request (operation 310), and then monitors the initial account following the transfer to determine whether any subsequent transactions occur (operation 320). If so (operation 330), the system analyzes each subsequent transaction to determine whether the subsequent transaction is associated with the transferred financial settings (operation 340). If a subsequent transaction is associated with the transferred financial settings (operation 350), the system may optionally perform a user- or system-specified action (operation 360), such as notifying an end user of "missed" financial settings that still need to be transferred or adjusted. By monitoring and analyzing subsequent transactions, the system verifies that the financial settings have been successfully transferred from the initial account to the destination account. Note that the system can monitor and verify the success of the account transfer over a time interval, as well as indefinitely (as indicated by the arrows from operations 330, 350, and 360 back to operation 320). Note also that while the initial account and the destination account are typically at different financial institutions, the system can also be used to manage an account switch between two accounts at the same institution.

In summary, in one embodiment of the present invention the described system reduces errors when switching accounts from a previous financial institution to a new financial institution by providing monitoring and verification techniques that detect any unexpected (e.g., un-transferred) transactions in a previous account. By using web and aggregation techniques to check the previous account over a time period, the system adds an additional level of accuracy and redundancy to the account transfer process. These techniques can be used to increase user confidence that the account-switching operation will not cause financial grief due to "lost" transactions and to improve the user experience by eliminating the need for users to manually check their previous accounts for problems. Note that such monitoring and verification operations can be managed by the destination financial institution after the initial account-switching request (as shown in FIG. 2), thereby not burdening the user with additional overhead and improving the user's experience.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method executed by a computer system that includes a processor for resolving errors for transferred financial settings, comprising:

upon receiving a transfer request, transferring a scheduled future transaction from an initial account to a destination account by transferring a set of financial settings that describe the scheduled future transaction to the destination account;

detecting an anomalous transaction in the initial account subsequent to the transfer;

analyzing the anomalous transaction and the transferred financial settings to identify a discrepancy for the transferred scheduled future transaction; and automatically resolving the cause of the identified discrepancy by performing one or more of the following operations:

repeating the transfer of the set of financial settings from the initial account to the destination account;

adjusting or deleting a parameter in the initial account that is associated with the scheduled future transaction; and adjusting a parameter in the destination account that is associated with the scheduled future transaction.

2. The method of claim 1, wherein automatically resolving the cause of the identified discrepancy involves one or more of the following:

verifying that a specified set of financial settings has been successfully transferred from the initial account to the destination account;

confirming that no transactions associated with the financial settings occur in the initial account after the transfer; and/or detecting additional transactions in the initial account that indicate errors or omissions in the transfer process.

3. The method of claim 1, wherein receiving the transfer request can further involve:

presenting an initial set of financial settings from the initial account to a user during a selection process; and receiving from the user all or a subset of the initial set of financial settings to be transferred to the destination account.

4. The method of claim 1, wherein the set of financial settings is associated with one or more of the following:

an automated funds transfer;

a bill pay transaction; and/or an Automated Clearing House transaction.

5. The method of claim 1, wherein the set of financial settings includes one or more of the following:

a name for a vendor;

an amount for a one-time and/or recurring financial transaction with the vendor;

a set of account and/or routing information associated with the vendor;

a schedule relating to financial transactions with the vendor; and/or historical data for financial transactions associated with the vendor.

6. The method of claim 1, wherein detecting the anomalous transaction further involves:

accessing the initial account after the transfer; and retrieving records for one or more subsequent transactions from the initial account.

7. The method of claim 6, wherein monitoring the initial account further involves accessing the initial account multiple times to retrieve records for one or more subsequent transactions.

8. The method of claim 1, wherein analyzing the anomalous transaction further involves performing a notification operation when the anomalous transaction is determined to be associated with the set of financial settings.

9. The method of claim 1, wherein analyzing the anomalous transaction involves one or more of:

comparing the anomalous transaction to a set of transactions specified by a user and/or administrator; and determining an amount, a description, and/or a pattern for one or more subsequent transactions.

10. The method of claim 1, wherein the method further involves one or more of the following:

disabling a recurring and/or scheduled transaction in the initial account associated with the set of financial settings;

deleting the set of financial settings from the initial account; and/or maintaining a copy of the financial settings in the initial account after the transfer.

11. A computer-readable storage medium storing instructions that when executed by a computer cause the computer to perform a method for resolving errors for transferred financial settings, the method comprising:

upon receiving a transfer request, transferring a scheduled future transaction from an initial account to a destination account by transferring a set of financial settings that describe the scheduled future transaction to the destination account;

detecting an anomalous transaction in the initial account subsequent to the transfer;

analyzing the anomalous transaction and the transferred financial settings to identify a discrepancy for the transferred scheduled future transaction; and automatically resolving the cause of the identified discrepancy by performing one or more of the following operations:

repeating the transfer of the set of financial settings from the initial account to the destination account;

adjusting or deleting a parameter in the initial account that is associated with the scheduled future transaction; and adjusting a parameter in the destination account that is associated with the scheduled future transaction.

12. The computer-readable storage medium of claim 11, wherein the set of financial settings is associated with one or more of the following:

an automated funds transfer;

a bill pay transaction; and/or an Automated Clearing House transaction.

13. The computer-readable storage medium of claim 11, wherein the set of financial settings includes one or more of the following:

a name for a vendor;

an amount for a one-time and/or recurring financial transaction with the vendor;

a set of account and/or routing information associated with the vendor;

a schedule relating to financial transactions with the vendor; and/or historical data for financial transactions associated with the vendor.

14. The computer-readable storage medium of claim 11, wherein detecting the anomalous transaction further involves:

accessing the initial account after the transfer; and retrieving records for one or more subsequent transactions from the initial account.

15. The computer-readable storage medium of claim 14, wherein detecting the anomalous transaction further involves accessing the initial account multiple times to retrieve records for one or more subsequent transactions.

16. The computer-readable storage medium of claim 11, wherein analyzing the anomalous transaction further involves performing a notification operation when the subsequent anomalous transaction is determined to be associated with the set of financial settings.

17. The computer-readable storage medium of claim 9, wherein analyzing the anomalous transaction involves one or more of:

comparing the anomalous transaction to a set of transactions specified by a user and/or administrator; and determining an amount, a description; and/or a pattern for one or more subsequent transactions.

18. A computing device that includes a processor that resolves errors for transferred financial settings, wherein the processor comprises:

a transfer mechanism configured to, upon receiving a transfer request, transfer a scheduled future transaction from an initial account to a destination account by transferring a set of financial settings that describe the scheduled future transaction to the destination account;

a monitoring mechanism configured to detect an anomalous transaction in the initial account subsequent to the transfer; and an analysis mechanism configured to analyze the anomalous transaction and the transferred financial settings to identify a discrepancy for the transferred scheduled future transaction;

wherein the analysis mechanism is further configured to automatically resolve the cause of the identified discrepancy by performing one or more of the following operations:

repeating the transfer of the set of financial settings from the initial account to the destination account;

adjusting or deleting a parameter in the initial account that is associated with the scheduled future transaction; and adjusting a parameter in the destination account that is associated with the scheduled future transaction.

* * * * *